(12) United States Patent
Hartley et al.

(10) Patent No.: US 12,204,556 B2
(45) Date of Patent: Jan. 21, 2025

(54) END-TO-END EVENT FLOWS THAT CONTAIN FILE LOCATIONS

(71) Applicant: GM GLOBAL TECHNOLOGY OPERATIONS LLC, Detroit, MI (US)

(72) Inventors: Steven Hartley, Pointe-Claire (CA); Frank Ghenassia, Ramat Gan (IL)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 18/070,568

(22) Filed: Nov. 29, 2022

(65) Prior Publication Data

US 2024/0176794 A1 May 30, 2024

(51) Int. Cl.
 *G06F 16/25* (2019.01)
(52) U.S. Cl.
 CPC ................................. *G06F 16/258* (2019.01)
(58) Field of Classification Search
 CPC ..................................................... G06F 16/258
 See application file for complete search history.

(56) References Cited

U.S. PATENT DOCUMENTS

| | | | | |
|---|---|---|---|---|
| 9,521,215 B1* | 12/2016 | Angert | ..................... | H04L 67/60 |
| 10,771,538 B2* | 9/2020 | Bender | ................... | H04L 47/83 |
| 11,558,459 B2* | 1/2023 | Lamba | ................. | H04L 67/1097 |
| 11,809,735 B1* | 11/2023 | Kumar | .................... | G06F 11/07 |
| 2015/0154211 A1* | 6/2015 | Matsubara | .............. | H04L 67/01 |
| | | | | 707/812 |
| 2015/0249618 A1* | 9/2015 | Golander | ................ | H04L 47/70 |
| | | | | 709/224 |
| 2017/0005515 A1* | 1/2017 | Sanders | ................... | H02J 3/388 |
| 2018/0041580 A1* | 2/2018 | Kadowaki | .............. | G06F 3/061 |
| 2018/0234481 A1* | 8/2018 | Bostick | ............... | H04L 67/1095 |
| 2019/0064787 A1* | 2/2019 | Maturana | .......... | G05B 23/0227 |
| 2019/0155534 A1* | 5/2019 | Eda | ........................ | G06F 16/182 |
| 2019/0386969 A1* | 12/2019 | Verzun | .................. | G06F 21/606 |
| 2020/0073993 A1* | 3/2020 | Mutreja | ................ | G06F 16/273 |
| 2020/0169480 A1* | 5/2020 | Shimokawa | ...... | H04M 15/8061 |
| 2020/0344299 A1* | 10/2020 | Sohail | ..................... | H04L 67/12 |
| 2021/0012282 A1* | 1/2021 | Smith | ....................... | H04L 9/50 |
| 2021/0091866 A1* | 3/2021 | Zhang | .................. | H04B 17/309 |
| 2021/0336932 A1* | 10/2021 | Chanak | ................... | H04L 9/006 |
| 2021/0377223 A1* | 12/2021 | Chanak | .................. | H04L 67/01 |
| 2022/0058166 A1* | 2/2022 | Bhatia | ................. | G06F 16/2456 |
| 2022/0300193 A1* | 9/2022 | Gao | ...................... | G06F 3/0661 |

(Continued)

*Primary Examiner* — Mark E Hershley
(74) *Attorney, Agent, or Firm* — Quinn IP Law (57) ABSTRACT

A method for end-to-end event flows includes storing a file associated with a source event at a source storage location in a source edge device, uploading the file to a cloud device, storing the file at a cloud storage location, generating a cloud event by changing a file path referenced in the source event to point to the cloud storage location of the file, and transferring the cloud event to the cloud device. The method includes transferring the cloud event to a destination edge device, downloading the file to the destination edge device, generating a destination event by changing the file path referenced in the cloud event to point to a destination storage location of the file, publishing an availability of the file in the destination edge device to multiple destination subscribers, and transferring the file from the destination storage location to one or more destination subscribers.

20 Claims, 5 Drawing Sheets

(56) References Cited

U.S. PATENT DOCUMENTS

| | | | |
|---|---|---|---|
| 2022/0368682 A1* | 11/2022 | Verzun | G06F 21/606 |
| 2023/0062354 A1* | 3/2023 | White | G06F 16/214 |
| 2023/0173395 A1* | 6/2023 | Cella | G06Q 30/06 |
| | | | 463/25 |

* cited by examiner

END-TO-END EVENT FLOWS THAT CONTAIN FILE LOCATIONS

INTRODUCTION

The present disclosure relates to a system and a method for end-to-end event flows that contain file locations.

Multiple subscribers on edge devices are often hidden behind firewalls making it difficult to transfer files between the edge devices. The files are generally consumed by multiple software entities and so point-to-point file transfers from a publisher to multiple subscribers has to be repeated multiple times. Currently no mechanism exists to link the files (both large and small) to event notifications through the publisher-subscriber pattern so file events utilize a multistep process that is cumbersome to application developers.

Accordingly, those skilled in the art continue with research and development efforts in the field of end-to-end event flows that move files to locations near the subscribers.

SUMMARY

A method for end-to-end event flows that contain file locations is provided herein. The method includes storing a file associated with a source event at a source storage location in a source edge device, uploading the file from the source edge device to a cloud device, storing the file at a cloud storage location in the cloud device, generating a cloud event by changing a file path referenced in the source event in the source edge device to point to the cloud storage location of the file in the cloud device, and transferring the cloud event from the source edge device to the cloud device. The method further includes transferring the cloud event from the cloud device to a destination edge device, downloading the file from the cloud device to the destination edge device, generating a destination event by changing the file path referenced in the cloud event to point to a destination storage location of the file in the destination edge device, publishing an availability of the file in the destination edge device to a plurality of destination subscribers in response to the destination event, and transferring the file from the destination storage location to one or more of the plurality of destination subscribers.

In one or more embodiments, the method includes routing the source event to a source streamer in the source edge device.

In one or more embodiments, the method includes detecting that the file is associated with the source event using the source streamer.

In one or more embodiments, the method includes triggering the uploading of the file from the source edge device to the cloud device in response to the detecting by the source streamer.

In one or more embodiments, the method includes detecting a completion of the uploading of the file from the source edge device to the cloud device. The generating of the cloud event in the source edge device is in response to the completion.

In one or more embodiments, the method includes publishing an availability of the file in the cloud device to a plurality of cloud subscribers in response to the cloud event, and transferring the file from the cloud storage location to one or more of the plurality of cloud subscribers.

In one or more embodiments, the method includes detecting that the file is associated with the cloud event using a cloud streamer in the cloud device.

In one or more embodiments, the method includes triggering the downloading of the file from the cloud device to the destination edge device in response to the detecting by the cloud streamer.

In one or more embodiments, the method includes sending the cloud event to a destination streamer in the destination edge device.

In one or more embodiments of the method, the destination streamer publishes the availability of the file in the destination edge device to the plurality of destination subscribers.

In one or more embodiments of the method, the cloud device is separate from the source edge device and the destination edge device, and the source edge device is separate from the destination edge device.

A method for end-to-end event uploads that contain file locations is provided herein. The method includes storing a file associated with a source event at a source storage location in a source edge device, uploading the file from the source edge device to a cloud device, storing the file at a cloud storage location in the cloud device, generating a cloud event by changing a file path referenced in the source event in the source edge device to point to the cloud storage location of the file in the cloud device, transferring the cloud event from the source edge device to the cloud device, publishing an availability of the file in the cloud device to a plurality of cloud subscribers in response to the cloud event, and transferring the file from the cloud storage location to one or more of the plurality of cloud subscribers.

In one or more embodiments, the method includes routing the source event to a source streamer in the source edge device.

In one or more embodiments, the method includes detecting that the file is associated with the source event with the source streamer.

In one or more embodiments, the method includes triggering the uploading of the file from the source edge device to the cloud device in response to the detecting by the source streamer.

In one or more embodiments, the method includes detecting a completion of the uploading of the file from the source edge device to the cloud device. The generating of the cloud event in the source edge device is in response to the completion.

A method for end-to-end event downloads that contain file locations is provided herein. The method includes storing a file at a cloud storage location in a cloud device. The file is associated with a cloud event, transferring the cloud event from the cloud device to a destination edge device. The method includes downloading the file from the cloud device to the destination edge device, generating a destination event by changing a file path referenced in the cloud event to point to a destination storage location of the file in the destination edge device, publishing an availability of the file in the destination edge device to a plurality of destination subscribers in response to the destination event, and transferring the file from the destination storage location to one or more of the plurality of destination subscribers.

In one or more embodiments, the method includes detecting that the file is associated with the cloud event using a cloud streamer in the cloud device.

In one or more embodiments, the method includes triggering the downloading of the file from the cloud device to the destination edge device in response to the detecting by the cloud streamer.

In one or more embodiments, the method includes sending the cloud event to a destination streamer in the destination edge device. The destination streamer publishes the availability of the file in the destination edge device to the plurality of destination subscribers.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system and/or a method to provide multiple applications on multiple edge devices to receive notifications (e.g., published events) regarding files that are automatically downloaded to local storage on behalf of the applications. The multiple applications are generally not directly addressable to each other. The disclosure provides a file transfer process from applications and/or services that simplifies a use case of sending an event that has an associated file and sending the associated file to the local storage.

Figure 1:
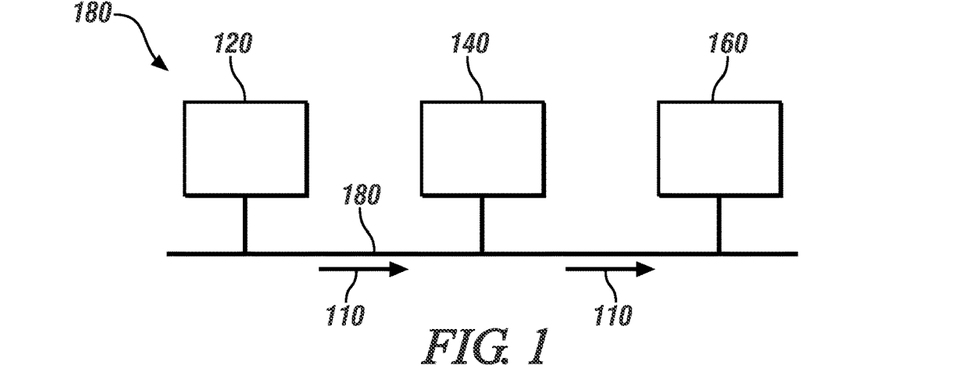
FIG. 1 is a schematic diagram illustrating a context of a system in accordance with one or more exemplary embodiments.

Referring to FIG. 1, a schematic diagram illustrating a context of a system 80 is shown in accordance with one or more exemplary embodiments. The system 80 generally includes a source edge device 120, a cloud device 140, multiple destination edge devices 160 (one shown), and a communication network 180. One or more files 110 are transferred via the communication network 180.

The source edge device 120 implements a computer. In various embodiments, the source edge computer may be a server computer. The source edge device 120 (or source circuit or source edge circuit) is operational to generate a file 110 associated with a source event, store the file 110 at a source storage location, uploading the file 110 to the cloud device 140, generate a cloud event by changing a path referenced in the source event in the source edge device 120 to point to a cloud storage location of the file 110 in the cloud device 140, and transfer the cloud event to the cloud device 140.

The cloud device 140 implements another computer. In various embodiments, the cloud computer may be a server computer. The cloud device 140 is in communication with the source edge device 120 and the destination edge device 160 via the communication network 180. The cloud device 140 is remotely located (e.g., another room to another city) from the source edge device 120 and the destination edge device 160. The cloud device 140 (or cloud circuit) is operational to receive the file 110 from the source edge device 120, store the file 110 at the cloud storage location in the cloud device 140, receive the cloud event from the source edge device 120, transfer the file 110 to the destination edge device 160, and transfer the cloud event to the destination edge device 160.

The destination edge device 160 implements yet another computer. In various embodiments, the destination edge computer may be a server computer. The destination edge device 160 (or destination circuit or destination edge circuit) is operational to download the file 110 from the cloud device 140, store the file 110 at a destination storage location in the destination edge device 160, receive the cloud event from the cloud device 140, generate a destination event by changing the path referenced in the cloud event to point to the destination storage location of the file 110 in the destination edge device 160, publishing an availability of the file 110 in the destination edge device 160 to multiple destination subscribers in response to the destination event, and transferring the file 110 from the destination storage location to one or more of the destination subscribers.

The communication network 180 implements one or more digital communication networks. The communication network 180 is generally operational to transfer data between the source edge device 120, the cloud device 140 and the destination edge device 160. The communication network 180 may include one or more wired networks and/or one or more wireless networks. In various embodiments, the communication network 180 may include the Internet, cellular networks, Wi-Fi networks, Ethernet networks, and the like.

Figure 2:
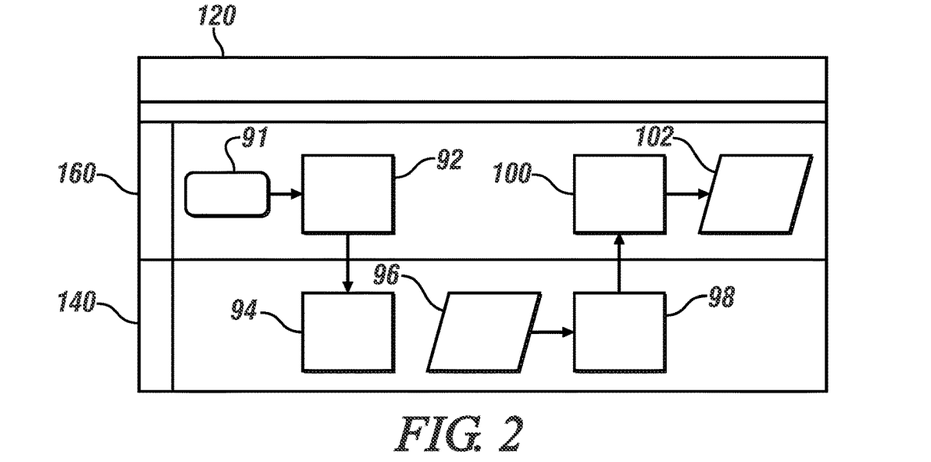
FIG. 2 is a schematic diagram of an edge-to-edge file event in accordance with one or more exemplary embodiments.

Referring to FIG. 2, a schematic diagram of an example implementation of an edge-to-edge file event 90 in shown in accordance with one or more exemplary embodiments. The edge-to-edge file event 90 is implemented by the system 80. The edge-to-edge file event 90 is illustrated transferring a file event in the source edge device 120 (e.g., a Device2) to the destination edge device 160 (e.g., a Device 1).

At a start 91, the destination edge device 160 may subscribe 92 to a file-based event produced in the source edge device 120 through normal publication-subscription design patterns. The subscription 92 from the destination edge device 160 is sent to the source edge device 120 via the cloud device 140 (not shown) and registered 94 at a service bus of the source edge device 120. At a later time, a producer process in the source edge device 120 publishes 96 a file event with a local file reference (or location or address). The source edge device 120 automatically uploads 98 one or more files associated with the file event and subsequently sends a notification to the destination edge device 160. The destination edge device 160 receives the notification that the file event has occurred and automatically downloads 100 the files to local storage location(s). The destination edge device 160 updates the file event with a new local path to the file and a re-publishes 102 the event to any applications that are currently subscribed 92 to the file event.

Figure 3:
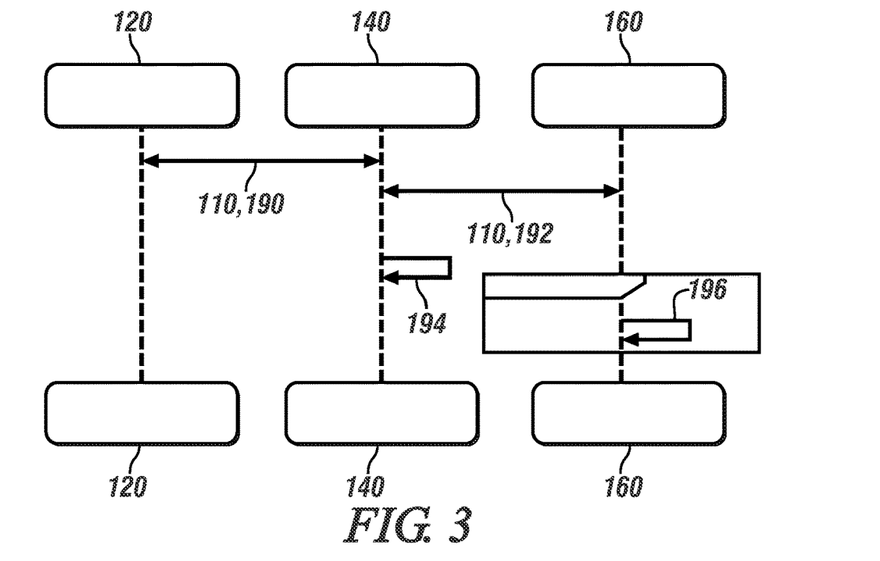
FIG. 3 is a schematic diagram of an edge-to-edge transfer in accordance with one or more exemplary embodiments.

Referring to FIG. 3, a schematic diagram of an example implementation of an edge-to-edge transfer is shown in accordance with one or more exemplary embodiments. The edge-to-edge transfer is implemented by the system 80.

Referring to FIG. 3 and FIG. 1, an edge file upload process 190 occurs in the source edge device 120 to upload a file 110 to the cloud device 140 in response to a source event in the source edge device 120. Once the upload has completed, an edge file download process 192 begins. The edge file download process 192 downloads the file 110 from the cloud device 140 to the destination edge device 160.

After the download has completed, the cloud device 140 may clean up a temporary storage location where the file 110 was stored in the cloud device 140. An attributes of the file event may be a time-to-live (TTL). When the time-to-live of the event has expired, the destination edge device 160 flushes the downloaded file 110 from the local memory. The uploading 190 to the cloud device 140 and the downloading 192 from the cloud device 140 may be implemented using one or more standard protocols, such as the secure file transfer protocol (SFTP) or the hypertext transfer protocol (HTTP). Other transfer protocols supported by the communication network 180 may be implemented to meet the design criteria of a particular implementation.

Figure 4:
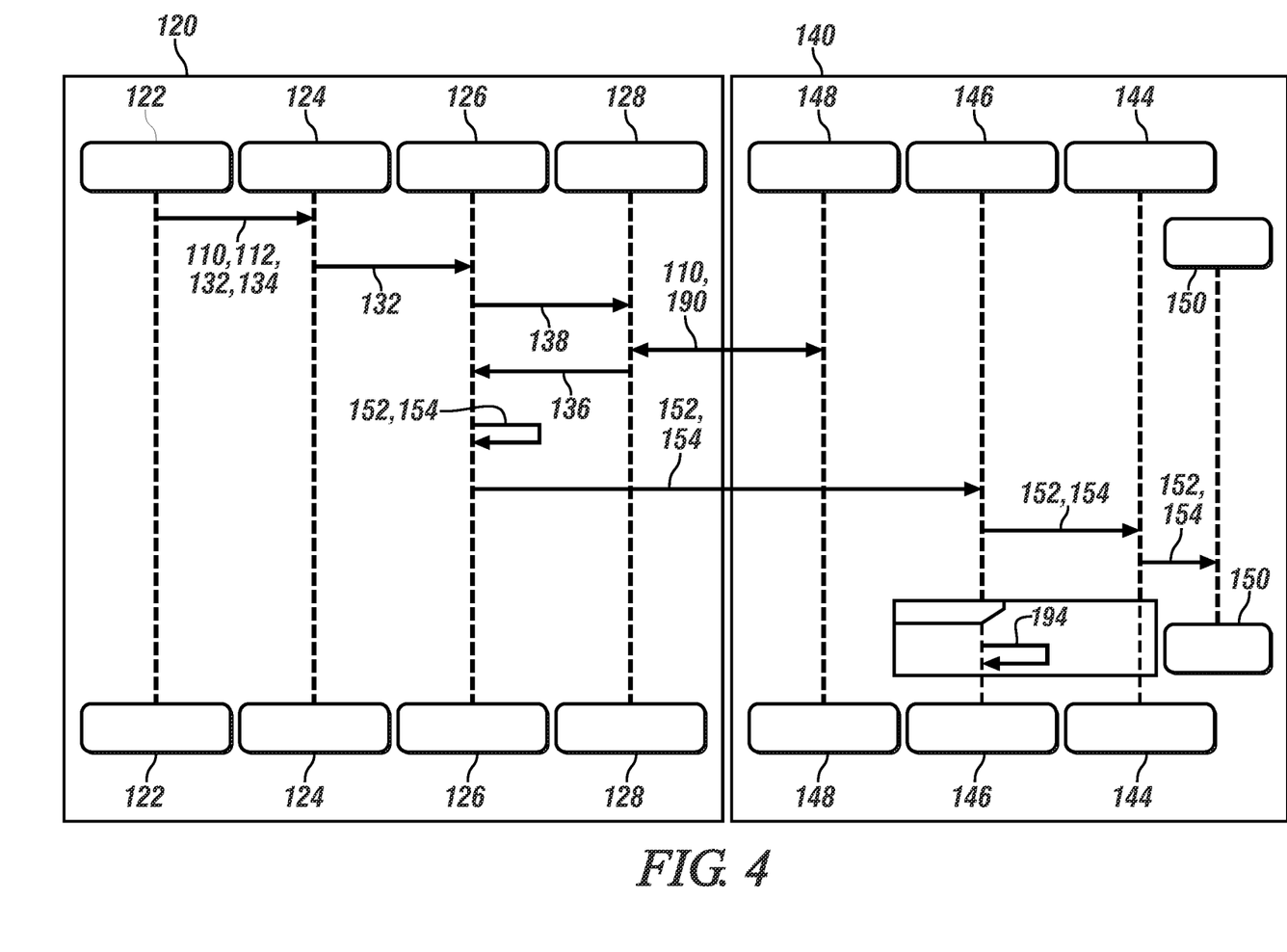
FIG. 4 is a schematic diagram of an edge upload in accordance with one or more exemplary embodiments.

Referring to FIG. 4, a schematic diagram of an example implementation of an edge upload is shown in accordance with one or more exemplary embodiments. The edge-upload is implemented by the source edge device 120 and the cloud device 140 in communication with each other via the communication network 180 (FIG. 1).

The source edge device 120 includes a source producer 122, a source event 122 bus, a source streamer 126, and a source file-streamer 128. The cloud device 140 includes a cloud event bus 144, a cloud streamer 146, a cloud file-streamer 148, and optionally one or more cloud subscribers 150.

The source producer 122 implements one or more software programs. The source producer 122 is operational to generate a source event 132 and publish the source event 132 to the source event 132 bus. The source producer 122 is also operational to generate one or more files 110 associated with the source event 132 (one shown). The file 110 may have a file path 112 to a source storage location 134 in the source edge device 120.

The source event bus 124 is operational to route the source event 132 to the source streamer 126.

The source streamer 126 is operational to detect if the source event 132 is of a particular type (e.g., a file.v1 type). The particular type indicates that the file 110 is associated with (e.g., referenced in) the source event 132. In response to the detection, the source streamer 126 issues a source command 138 (CMD1) to the source file-streamer 128. The source command 138 triggers the upload 190 of the file 110 to the cloud device 140. Once the upload 190 of the file 110 is complete, the source streamer 126 is further operational to generate a cloud event 152 by changing the file path 112 referenced in the source event 132 to point to a cloud storage location of the file 110 in the cloud device 140. As such, the cloud event 152 references the cloud storage location 154 of the file 110 as stored in the cloud device 140. The source streamer 126 subsequently transfers the cloud event 152 to the cloud device 140 via the source file-streamer 128.

The source file-streamer 128 is operational to communicate with the cloud file-streamer 148 in the cloud device 140. The source file-streamer 128 may upload the file 110 to the cloud file-streamer 148 in response to the source command 138 from the source streamer 126. The files 110 associated with the file event are uploaded using file transfer software such as SFTP or HTTP. Other file transfer protocols may be implemented to meet the design criteria of a particular application. Once the upload is complete 136 (Complete1), the source streams notifies the source streamer 126. The source file-streamer 128 may also transfer the cloud event 152 to the cloud file-streamer 148.

The cloud file-streamer 148 is operational to communicate with the source file-streamer 128 in the source edge device 120. The cloud file-streamer 148 may receive the file 110 from the source file-streamer 128, and transfer the file 110 to the cloud streamer 146. The cloud file-streamer 148 may also receive the cloud event 152 from the source file-streamer 128, and transfer the cloud event 152 to the cloud streamer 146.

The cloud streamer 146 is operational to transfer the cloud event 152 as received from the cloud file-streamer 148 to the cloud event bus 144. The cloud streamer 146 is also operational to store the file 110 at the cloud storage location. In response to expiration of the time-to-live timer of the cloud event 152, the cloud streamer 146 flushes (or deletes) 194 the file 110 from local memory.

The cloud event bus 144 is operational to route the cloud event 152 the cloud subscribers 150 that have subscribed to the source event 132 in the source edge device 120. The cloud subscribers 150 may receive the cloud event 152 as a substitute for the original source event 132. The cloud event 152 contains the new cloud storage location 154 into the cloud memory where the files 110 are located. The cloud subscribers 150 may access the files 110 from the (local) cloud storage location 154.

The cloud subscribers 150 implement one or more software programs. The cloud subscribers 150 are operational to subscribe to the source event 132 and access the file 110 from the cloud storage location 154 in response to the source event 132 being published.

An example pseudo code for the file upload may be as follows:

```
// File event
SE: {
    "id" : "203ccbe6-d1e6-41c9-abe0-123456789abc",
    "source" : "ultifi://SourceEdgeDevice/service/1
/file_event",
    "specversion" : "1",
    "type" : "file.v1",
    "data" : "file:///tmp/dump.txt"
}
// Same as SE with change below
CE: {
    "data" : "file:///tmp/0HZBtvqwRm3TTPjjWKoz.txt"
}
//CMD: PULL
    sftp tmp/dump.txt USERINFO@CloudDevice/tmp
/0HZBtvqwRm3TTPjjWKoz.txt
```

Figure 5:
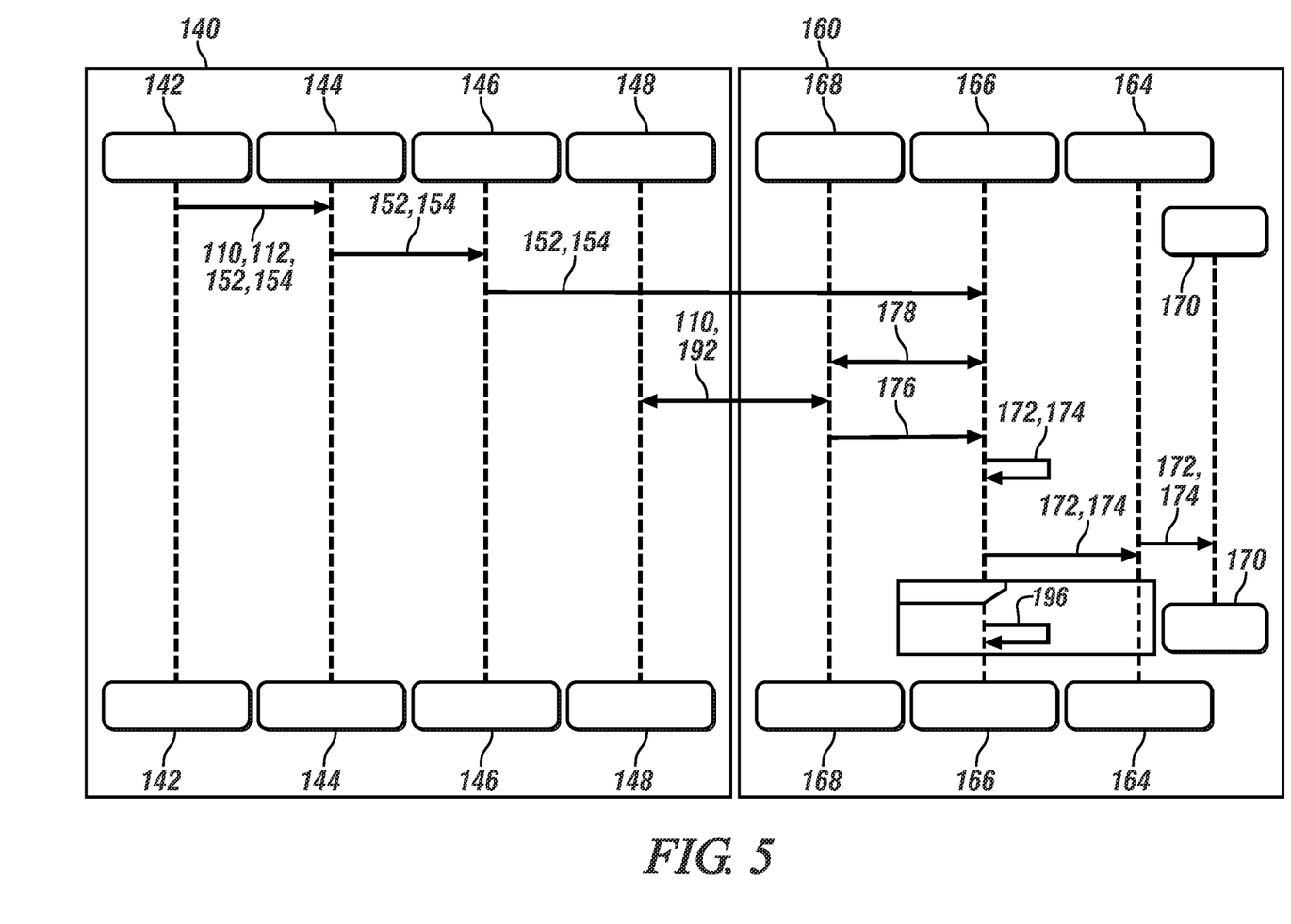
FIG. 5 is a schematic diagram of an edge download in accordance with one or more exemplary embodiments.

Referring to FIG. 5, a schematic diagram of an example implementation of an edge download is shown in accordance with one or more exemplary embodiments. The edge download is implemented by the cloud device 140 and the destination edge device 160 in communication with each other via the communication network 180 (FIG. 1).

The destination edge device 160 includes a source producer 122, a destination event bus 164, a destination streamer 166, a destination file-streamer 168, and one or more destination subscribers 170. The cloud device 140 may also include a cloud producer 142.

The cloud producer 142 implements one or more software programs. In various situations, the cloud producer 142 is operational to generate the cloud event 152 and publish the cloud event 152 to the cloud event bus 144. The cloud producer 142 is also operational to generate the one or more files 110 associated with the cloud event 152 (one shown). The file 110 may have the file path 112 to the cloud storage location in the cloud device 140. In other situations, the cloud event 152 and the file 110 may be received from the source edge device 120, as shown in FIG. 4.

The cloud event bus 144 is operational to route the cloud event 152 from the cloud producer 142 to the cloud streamer 146.

The cloud streamer 146 is operational to send the cloud event 152 and the file 110 to the destination edge device 160 via the cloud file-streamer 148.

The cloud file-streamer 148 is operational to communicate with the destination file-streamer 168 in the destination edge device 160. The destination file-streamer 168 may download 192 the file 110 to the destination file-streamer 168. The files 110 associated with the file event are downloaded using file transfer software such as SFTP or HTTP. Other file transfer protocols may be implemented to meet the design criteria of a particular application.

The destination file-streamer 168 is operational to communicate with the cloud file-streamer 148 in the cloud device 140. The destination file-streamer 168 may also receive the cloud event 152 from the cloud file-streamer 148, and transfer the cloud event 152 to the destination streamer 166. The destination file-streamer 168 may receive (download) the file 110 from the cloud file-streamer 148, and transfer the file 110 to the destination streamer 166. Once the download is complete 176 (Complete2), the destination file-streamer 168 notifies the destination streamer 166.

The destination streamer 166 is operational to store the file 110 at the destination storage location 174. The destination streamer 166 is also operational to detect if the cloud event 152 is of a particular type (e.g., a file.v1 type). The particular type indicates that the file 110 is associated with (e.g., referenced in) the cloud event 152. In response to the detection, the destination streams issues a destination command 178 (CMD2) to the destination file-streamer 168. The destination command 178 triggers the download of the file 110 to the destination edge device 160. Once the download of the file 110 is complete 176, the destination streamer 166 is further operational to generate a destination event 172 by changing the file path 112 referenced in the cloud event 152 to point to the destination storage location 174 of the file 110 in the destination edge device 160. As such, the destination event 172 references the destination storage location 174 of the file 110 as stored in the destination edge device 160. The destination streamer 166 subsequently transfers the destination event 172 to the destination event bus 164. In response to expiration of the time-to-live timer of the cloud event 152, the destination streamer 166 flushes (or deleted) 196 the file 110 from the local memory.

The destination event bus 172 is operational to route the destination event 172 the destination subscribers 170 that have subscribed to the cloud event 152 in the cloud device 140. The destination subscribers 170 may receive the destination event 172 as a substitute for the original cloud event 152. The destination event 172 contains the new destination storage location 174 into the destination memory where the files 110 are located. The destination subscribers 170 may access files 110 from the (local) destination storage location 174.

The destination subscribers 170 implement one or more software programs. The destination subscribers 170 are operational to subscribe to the source event 132 and access the file 110 from the destination storage location 174 in response to the source event 132 being published.

An example pseudo code for the file download may be as follows:

```
// File event
CE: {
  "id" : "203ccbe6-d1e6-41c9-abe0-123456789abc",
  "source" : "ultifi://CloudDevice/service/1
  /file_event",
  "specversion" : "1",
  "type" : "file.v1",
  "data" : "file:///tmp/dump.txt"
}
// Same as CE with change below
DE: {
  "data" : "file:///tmp/0HZBtvqwRm3TTPjjWKoz.txt"
}
//CMD2: PULL
  sftp DestEdgeDevice/tmp/dump.txt /tmp/0HZBtvqwRm3TTPjjWKoz.txt
```

Figure 6:
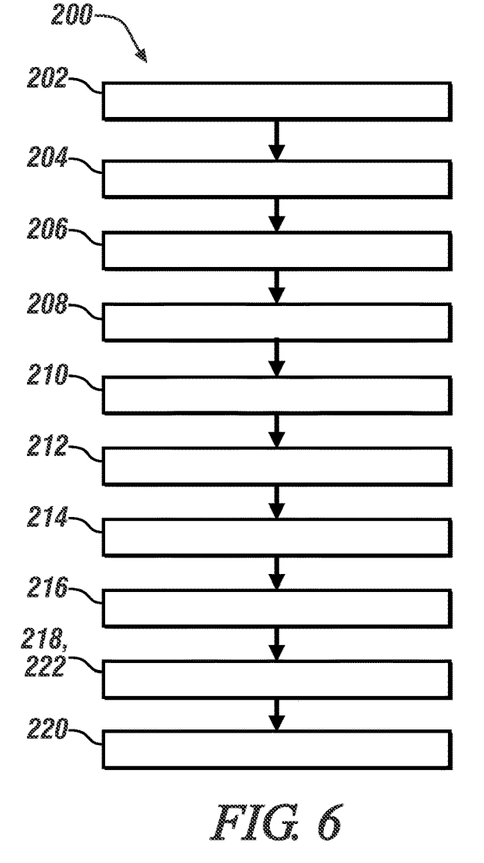
FIG. 6 is a flow diagram of a method for end-to-end event flows that contain file locations in accordance with one or more exemplary embodiments.

Referring to FIG. 6, a flow diagram of an example method 200 for end-to-end event flows that contain file locations is shown in accordance with one or more exemplary embodiments. The method (or process) 200 is implemented by the system 80. The method 200 generally includes steps 202 to 220, as illustrated. The sequence of steps is shown as a representative example. Other step orders may be implemented to meet the criteria of a particular application.

Referring to FIGS. 3 to 6, in the step 202 the file 110 associated with the source event 132 is stored at a source storage location 134 in the source edge device 120. The file 110 is uploaded in the step 204 from the source edge device 120 to the cloud device 140. The file 110 is stored at the cloud storage location in the cloud device 140 in the step 206.

In the step 208, the source edge device 120 generate a cloud event 152 by changing the file path 112 referenced in the source event 132 to point to the cloud storage location of the file 110 in the cloud device 140. The cloud event 152 is transferred in the step 210 from the source edge device 120 to the cloud device 140. The cloud event 152 is subsequently transferred in the step 212 from the cloud device 140 to the destination edge device 160. The destination edge device 160 downloads the file 110 from the cloud device 140 in the step 214.

In the step 216, the destination edge device 160 generates a destination event 172 by changing the file path 112 referenced in the cloud event 152 to point to the designation storage location of the file 110 in the destination edge device 160. The availability 222 of the file 110 in the destination edge device 160 is published in the step 218 to the destination subscribers 170 in response to the destination event 172. The file 110 is transferred to the destination storage location 174 in the destination edge device 160 to one or more of the destination subscribers 170 seeking in the step 220.

Figure 7:
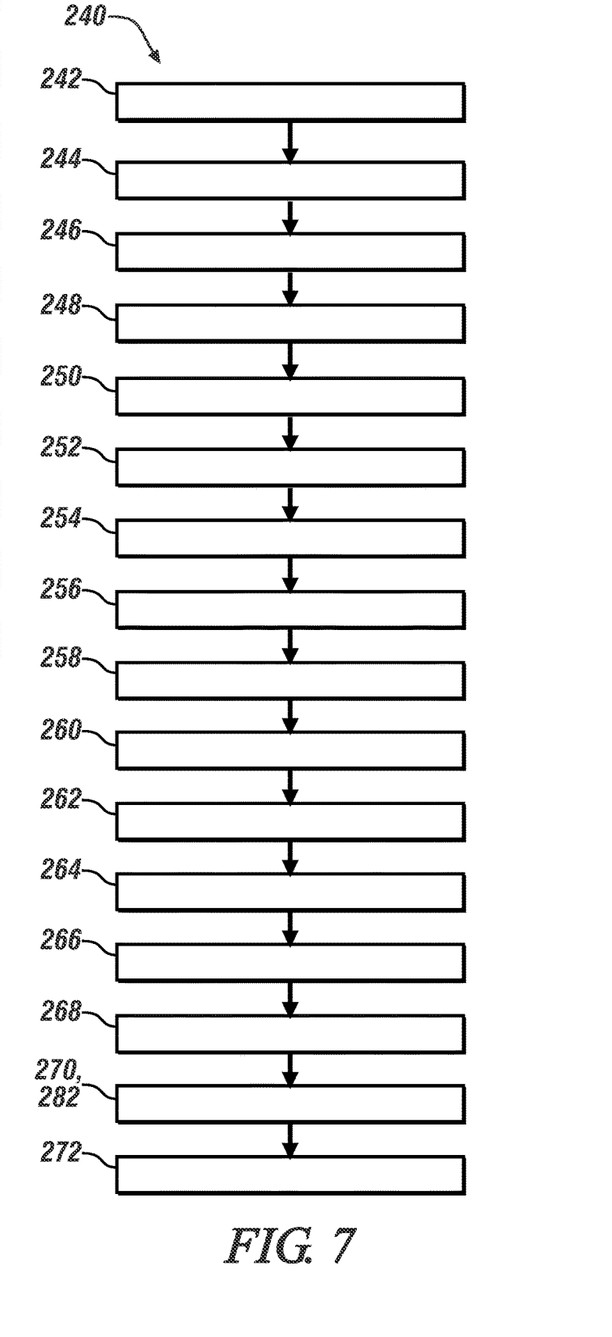
FIG. 7 is a flow diagram of a method for end-to-end event uploading flows that contain file locations in accordance with one or more exemplary embodiments.

Referring to FIG. 7, a flow diagram of an example method for end-to-end event uploading flows that contain file locations is shown in accordance with one or more exemplary embodiments. The method (or process) 240 is implemented by the system 80. The method 240 generally includes steps 242 to 272, as illustrated. The sequence of steps is shown as a representative example. Other step orders may be implemented to meet the criteria of a particular application.

Referring to FIG. 7 and FIG. 4, in the step 242 the source producer 122 may generate the source event 132. The file 110 associated with the source event 132 is stored in the step 244 at a source storage location 134 in the source edge device 120. The source event 132 is published to the source event bus 124 in the step 246.

In the step 248, the source event 132 is routed to the source streamer 126. The source streamer 126 detects in the step 250 that the file 110 is associated with the source event 132. In response to the detection, the source file-streamer 128 uploads the file 110 to the cloud file-streamer 148 in the step 252.

In the step 254, upon detecting the completion 136 of the upload of the file 110 from the source edge device 120 to the cloud device 140, the source file-streamer 128 notifies the source streamer 126. The generating of the cloud event 152 in the source edge device 120 is in response to the completion 136 as detected. The cloud event 152 is sent in the step 256 from the source streamer 126 to the source file-streamer 128. The source file-streamer 128 uploads the file 110 from the source storage location 134 to the cloud file-streamer 148 in the step 258.

In the step 260, the cloud file-streamer 148 stores the file 110 received from the source file-streamer 128 at the cloud storage location in the cloud device 140. A cloud event 152 is generated by the source streamer 126 in the step 262 by changing the file path 112 referenced in the source event 132 to point to the cloud storage location of the file 110 in the cloud device 140. The cloud event 152 is transferred from the source edge device 120 (the source streamer 126) to the cloud device 140 in the step 264.

In the step 266, the cloud device 140 receives the cloud event 152 from the source edge device 120. The cloud event 152 is sent in the step 268 from the cloud streamer 146 to the cloud event bus. The availability 282 of the file 110 in the cloud device 140 is transferred from the cloud event bus to the cloud subscribers 150 in response to the cloud event 152 in the step 270. The file 110 is transferred in the step 272 from the cloud storage location to one or more of the cloud subscribers 150 seeking the file 110.

Figure 8:
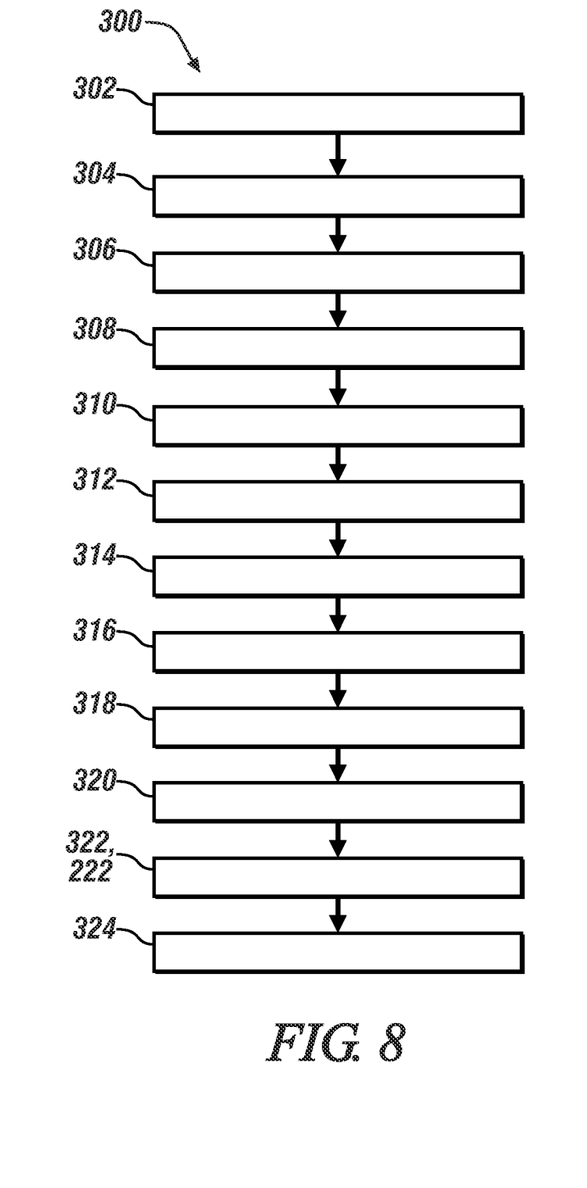
FIG. 8 is a flow diagram of a method for end-to-end event downloading flows that contain file locations in accordance with one or more exemplary embodiments.

Referring to FIG. 8, a flow diagram of an example method for end-to-end event downloading flows that contain file locations is shown in accordance with one or more exemplary embodiments. The method (or process) 300 is implemented by the system 80. The method 300 generally includes steps 302 to 324, as illustrated. The sequence of steps is shown as a representative example. Other step orders may be implemented to meet the criteria of a particular application. The method begins with the cloud event 152 and the file 110 being initially generated within the cloud device 140. Alternatively, the cloud event 152 and the file 110 are received by the cloud device 140 from the source edge device 120.

Referring to FIG. 8 and FIG. 5, in the step 302 a cloud producer 142 generates a cloud event 152. The file 110 associated with the cloud event 152 is stored in the step 304 at the cloud storage location in the cloud device 140. The cloud event 152 is published to the cloud event bus 144 in the step 306. The cloud event 152 is routed to the cloud streamer 146 in the step 308.

In the step 310, the cloud streamer 146 transfers the cloud event 152 to the destination streamer 166 in the destination edge device 160. The destination streamer 166 detects in the step 312 that the file 110 is associated with the cloud event 152. The detection triggers the download of the file 110 from the cloud file-streamer 148 to the destination file-streamer 168 in the step 314.

In the step 316, the destination streamer 166 detects the completion 176 of the download of the file 110 from the cloud device 140 to the destination edge device 160. The file 110 is stored in the step 318 at the destination storage location 174 in the destination edge device 160. The destination event 172 is generated destination edge device 160 by changing the file path 112 referenced in the cloud event 152 to point to the destination storage location 174 of the file 110 in the destination edge device 160 in the step 320.

In the step 322, the destination streamer 166 publishes the availability 222 of the file 110 in the destination edge device 160 to the destination subscribers 170 in response to the destination event 172. The file 110 is transferred in the step 324 from the destination storage location 174 to one or more of the destination subscribers 170 that seek the file 110.

Embodiments of the disclosure combines event transfers and file transfers, as part of a single notification process among edge devices in a communication network 180. File information is transferred seamlessly to the producers and consumers making the file 110 available to multiple consumers without each consumer requesting the content.

Embodiments of the disclosure generally provide a method for end-to-end event flows that contain file locations. Between a source edge device and a cloud device, the method includes storing a file associated with a source event at a source storage location in the source edge device, uploading the file from the source edge device to the cloud device, storing the file at a cloud storage location in the cloud device, generating a cloud event by changing a file path referenced in the source event in the source edge device to point to the cloud storage location of the file in the cloud device, and transferring the cloud event from the source edge device to the cloud device. Between the cloud device and a destination edge device, the method further includes transferring the cloud event from the cloud device to the destination edge device, downloading the file from the cloud device to the destination edge device, generating a destination event by changing the file path referenced in the cloud event to point to a destination storage location of the file in the destination edge device, publishing an availability of the file in the destination edge device to a plurality of destination subscribers in response to the destination event, and transferring the file from the destination storage location to one or more of the plurality of destination subscribers.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A method for end-to-end event flows that contain file locations comprising:

storing a data file associated with a source event file at a source storage location in a source edge device, wherein (i) the source edge device provides an entry point into a cloud, and (ii) the source event file indicates that the data file is to be made available to a plurality of destination subscribers;

uploading the data file from the source edge device to a cloud device, wherein the cloud device is within the cloud;
storing the data file at a cloud storage location in the cloud device;
generating a cloud event file by changing a file path referenced in the source event file in the source edge device to point to the cloud storage location of the data file in the cloud device;
transferring the cloud event file from the source edge device to the cloud device;
transferring the cloud event file from the cloud device to a destination edge device, wherein the destination edge device provides an exit point from the cloud;
downloading the data file from the cloud device to the destination edge device;
generating a destination event file by changing the file path referenced in the cloud event file to point to a destination storage location of the data file in the destination edge device;
publishing an availability of the data file in the destination edge device to a plurality of destination subscribers in response to the destination event, wherein the plurality of destination subscribers are outside the cloud; and
transferring the data file from the destination storage location to one or more of the plurality of destination subscribers.

2. The method according to claim 1, further comprising:
routing the source event file to a source streamer in the source edge device.

3. The method according to claim 2, further comprising:
detecting that the data file is associated with the source event file using the source streamer.

4. The method according to claim 3, further comprising:
triggering the uploading of the data file from the source edge device to the cloud device in response to the detecting by the source streamer.

5. The method according to claim 4, further comprising:
detecting a completion of the uploading of the data file from the source edge device to the cloud device, wherein the generating of the cloud event file in the source edge device is in response to the completion.

6. The method according to claim 1, further comprising:
publishing an availability of the data file in the cloud device to a plurality of cloud subscribers in response to the cloud event file, wherein the cloud subscribers are within the cloud; and
transferring the data file from the cloud storage location to one or more of the plurality of cloud subscribers, wherein the plurality of cloud subscribers are within the cloud.

7. The method according to claim 1, further comprising:
detecting that the data file is associated with the cloud event file using a cloud streamer in the cloud device.

8. The method according to claim 7, further comprising:
triggering the downloading of the data file from the cloud device to the destination edge device in response to the detecting by the cloud streamer.

9. The method according to claim 8, further comprising:
sending the cloud event file to a destination streamer in the destination edge device.

10. The method according to claim 9, wherein the destination streamer publishes the availability of the data file in the destination edge device to the plurality of destination subscribers.

11. The method according to claim 1, wherein the cloud device is separate from the source edge device and the destination edge device, and the source edge device is separate from the destination edge device.

12. A method for end-to-end event uploads that contain file locations comprising:
storing a data file associated with a source event file at a source storage location in a source edge device, wherein the source edge device provides an entry point into a cloud;
uploading the data file from the source edge device to a cloud device, wherein the cloud device is within the cloud;
storing the data file at a cloud storage location in the cloud device;
generating a cloud event file by changing a file path referenced in the source event file in the source edge device to point to the cloud storage location of the data file in the cloud device;
transferring the cloud event file from the source edge device to the cloud device;
publishing an availability of the data file in the cloud device to a plurality of cloud subscribers in response to the cloud event file, wherein the plurality of cloud subscribers are within the cloud; and
transferring the data file from the cloud storage location to one or more of the plurality of cloud subscribers.

13. The method according to claim 12, further comprising:
routing the source event file to a source streamer in the source edge device.

14. The method according to claim 13, further comprising:
detecting that the data file is associated with the source event file with the source streamer.

15. The method according to claim 14, further comprising:
triggering the uploading of the data file from the source edge device to the cloud device in response to the detecting by the source streamer.

16. The method according to claim 15, further comprising:
detecting a completion of the uploading of the data file from the source edge device to the cloud device, wherein the generating of the cloud event file in the source edge device is in response to the completion.

17. A method for end-to-end event downloads that contain file locations comprising:
storing a data file at a cloud storage location in a cloud device, wherein (i) the data file is associated with a cloud event file and (ii) the cloud device is within a cloud;
transferring the cloud event file from the cloud device to a destination edge device, wherein the destination edge device provides an exit point from the cloud;
downloading the data file from the cloud device to the destination edge device;
generating a destination event file by changing a file path referenced in the cloud event file to point to a destination storage location of the data file in the destination edge device;
publishing an availability of the data file in the destination edge device to a plurality of destination subscribers in response to the destination event file, wherein the plurality of destination subscribers are outside the cloud; and
transferring the data file from the destination storage location to one or more of the plurality of destination subscribers.

18. The method according to claim 17, further comprising:
    detecting that the data file is associated with the cloud event file using a cloud streamer in the cloud device.

19. The method according to claim 18, further comprising:
    triggering the downloading of the data file from the cloud device to the destination edge device in response to the detecting by the cloud streamer.

20. The method according to claim 19, further comprising:
    sending the cloud event file to a destination streamer in the destination edge device, wherein the destination streamer publishes the availability of the data file in the destination edge device to the plurality of destination subscribers.

\* \* \* \* \*